US011104188B2

(12) United States Patent
Maki et al.

(10) Patent No.: US 11,104,188 B2
(45) Date of Patent: Aug. 31, 2021

(54) VEHICLE TIRE-WHEEL ASSEMBLY

(71) Applicant: HONDA MOTOR CO., LTD., Tokyo (JP)

(72) Inventors: Toshimitsu Maki, Wako (JP); Ryoji Inaba, Wako (JP); Kenichi Nagatomi, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 155 days.

(21) Appl. No.: 16/405,084

(22) Filed: May 7, 2019

(65) Prior Publication Data

US 2019/0344628 A1 Nov. 14, 2019

(30) Foreign Application Priority Data

May 9, 2018 (JP) .............................. JP2018-090991

(51) Int. Cl.
*B60C 19/00* (2006.01)

(52) U.S. Cl.
CPC .................................. *B60C 19/002* (2013.01)

(58) Field of Classification Search
CPC .................................................. B60C 19/002
See application file for complete search history.

(56) References Cited

U.S. PATENT DOCUMENTS

2002/0104600 A1* 8/2002 Flament .............. B60C 15/0236
152/381.4
2008/0277997 A1* 11/2008 Kamiyama ........... B60C 19/002
301/95.101

FOREIGN PATENT DOCUMENTS

| JP | 2004148978 | * | 5/2004 | ............. B60C 17/04 |
| JP | 2004330862 | * | 11/2004 | ............. B60B 21/12 |
| JP | 2008126806 | * | 6/2008 | ............. B60B 21/02 |
| JP | 2012-045971 A | | 3/2012 | |

* cited by examiner

*Primary Examiner* — Matthew J Daniels
*Assistant Examiner* — Shibin Liang
(74) *Attorney, Agent, or Firm* — Rankin, Hill & Clark LLP

(57) ABSTRACT

A vehicle tire-wheel assembly includes: a wheel main body; a Helmholtz resonator provided on an outer peripheral surface of a well portion of the wheel main body; a tire attached to an outer peripheral surface of the wheel main body so that the tire covers the Helmholtz resonator; and a separation restraining part which, in cooperation with the tire, restrains the Helmholtz resonator from separating from the outer peripheral surface of the well portion.

18 Claims, 6 Drawing Sheets

VEHICLE TIRE-WHEEL ASSEMBLY

CROSS-REFERENCE TO RELATED APPLICATIONS

The present application claims priority under 35 U.S.C. § 119 to Japanese Patent Application No. 2018-090991, filed May 9, 2018, the contents of which are hereby incorporated by reference in their entirety.

BACKGROUND OF THE INVENTION

1. Field of the Invention

The present invention relates to a vehicle tire-wheel assembly.

2. Description of the Related Art

There has heretofore been known a Helmholtz resonator which is disposed on an outer peripheral surface of a well portion of a wheel and which includes two edge portions projecting in a wheel width direction and being locked with circumferential grooves of a rim (see, for example, Japanese Patent Application Publication No. 2012-45971).

When the Helmholtz resonator is pressed against the outer peripheral surface of the well portion, two edge portions of the Helmholtz resonator are elastically deformed and thus easily fitted into the circumferential grooves. Accordingly, the above-described Helmholtz resonator can be easily attached to the wheel.

SUMMARY OF THE INVENTION

Problem to be Solved by Invention

This means that a conventional wheel provided with the aforementioned Helmholtz resonator (see, for example, Japanese Patent Application Publication No. 2012-45971) needs to undergo cutting work in order to form the circumferential grooves in the rim for attaching the resonator. As a consequence, this wheel is likely to face a problem of a complicated manufacturing process and a resultant increase in manufacturing cost. In addition, when a vehicle equipped with tires attached to such wheels travels, the Helmholtz resonator attached to the outer peripheral surface of the well portion is subjected to an extremely large centrifugal force generated by high speed revolutions of the tire. Therefore, the attachment structure of the resonator needs to withstand the centrifugal force.

Against this background, an object of the present invention is to provide a vehicle tire-wheel assembly capable of preventing a Helmholtz resonator from separating from of a wheel main body due to centrifugal force using a simple configuration.

Solution to Problem

A vehicle tire-wheel assembly according an aspect of the present invention includes: a wheel main body; a Helmholtz resonator provided on an outer peripheral surface of a well portion of the wheel main body; a tire attached to an outer peripheral surface of the wheel main body so that the tire covers the Helmholtz resonator; and a separation restraining part which, in cooperation with the tire, restrains the Helmholtz resonator from separating from the outer peripheral surface of the well portion.

Advantageous Effect of the Invention

The present invention can prevent the Helmholtz resonator from separating from the wheel main body due to centrifugal force with a simple configuration.

DETAILED DESCRIPTION OF EMBODIMENTS

Hereinafter, vehicle wheels according to embodiments of the present invention will be described in detail with reference to the accompanying drawings on an as-needed basis. In reference to FIG. 1 to FIG. 6, "X" indicates a wheel circumferential direction, "Y" indicates a wheel width direction, and "Z" indicates a wheel radial direction. In addition, in terms of the wheel width direction Y, the vehicle width direction inner side is referred to as "one side" and the outer side is referred to as "other side".

Overall Configuration of Vehicle Wheel

Figure 1:
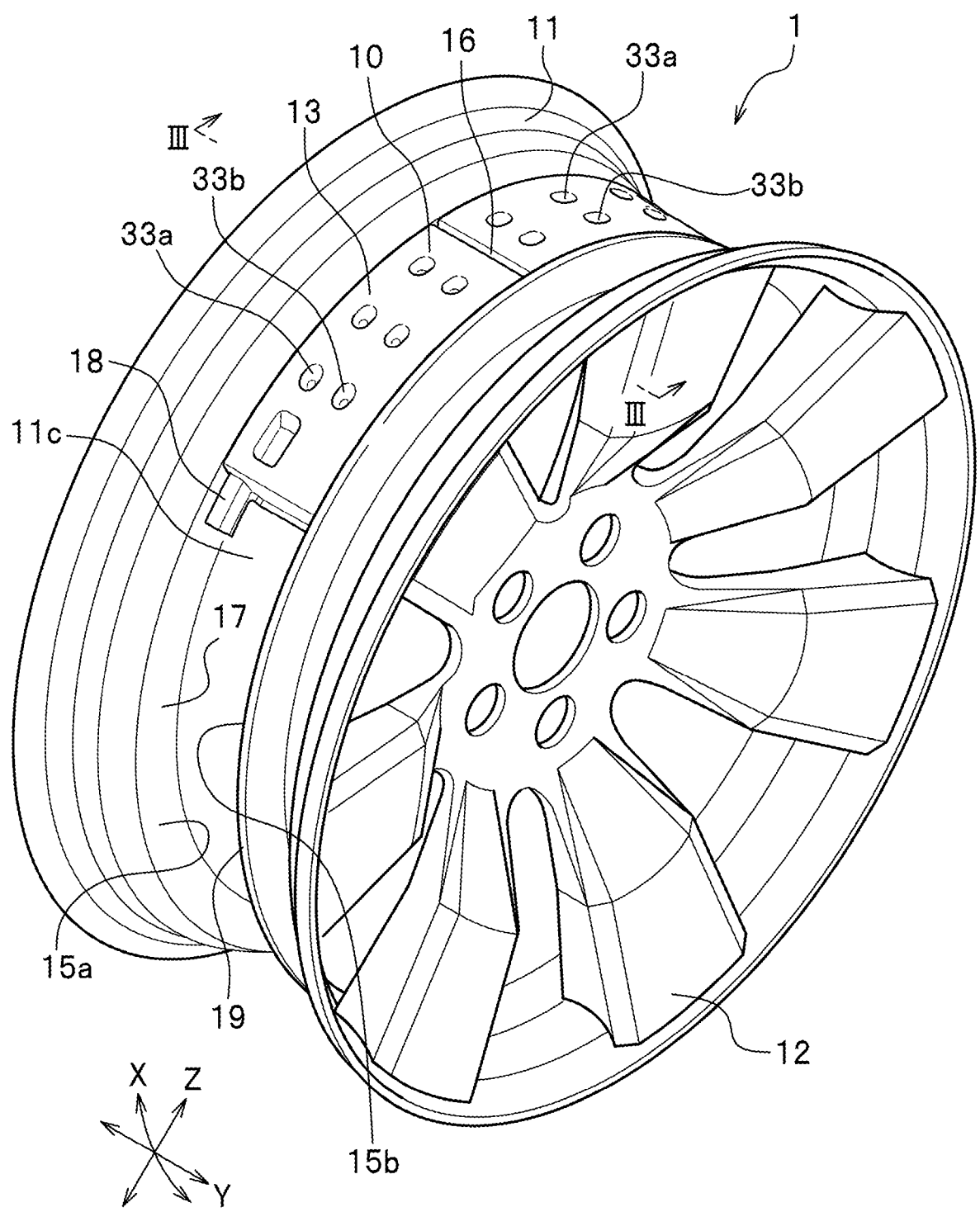
FIG. 1 is a perspective view of a vehicle wheel according to a first embodiment of the present invention.
Figure 2:
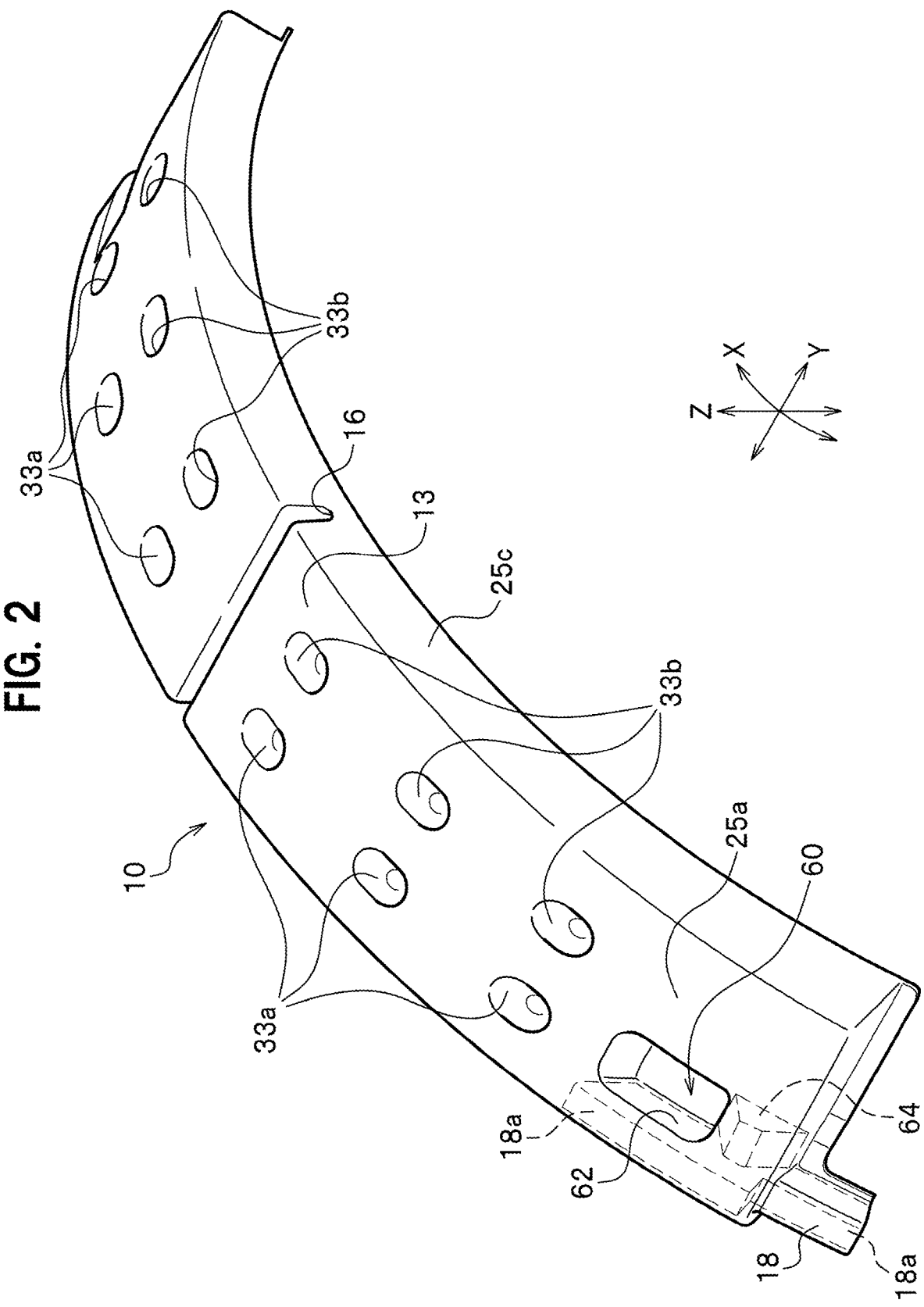
FIG. 2 is an overall perspective view of a sub-air chamber member.
Figure 3:
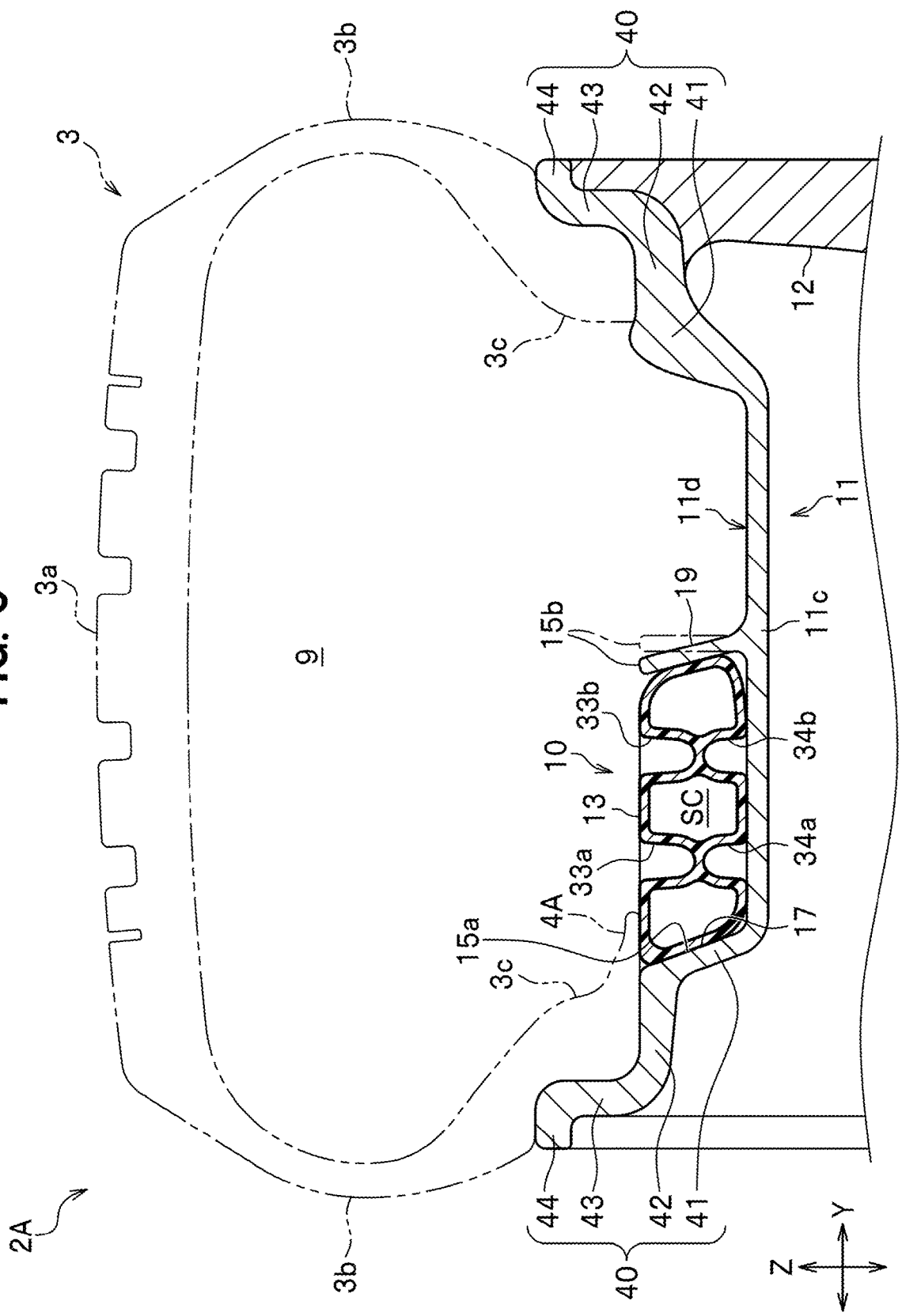
FIG. 3 is a cross-sectional view of a vehicle tire-wheel assembly according to the first embodiment of the present invention taken along line III-III in FIG. 1.
Figure 4:
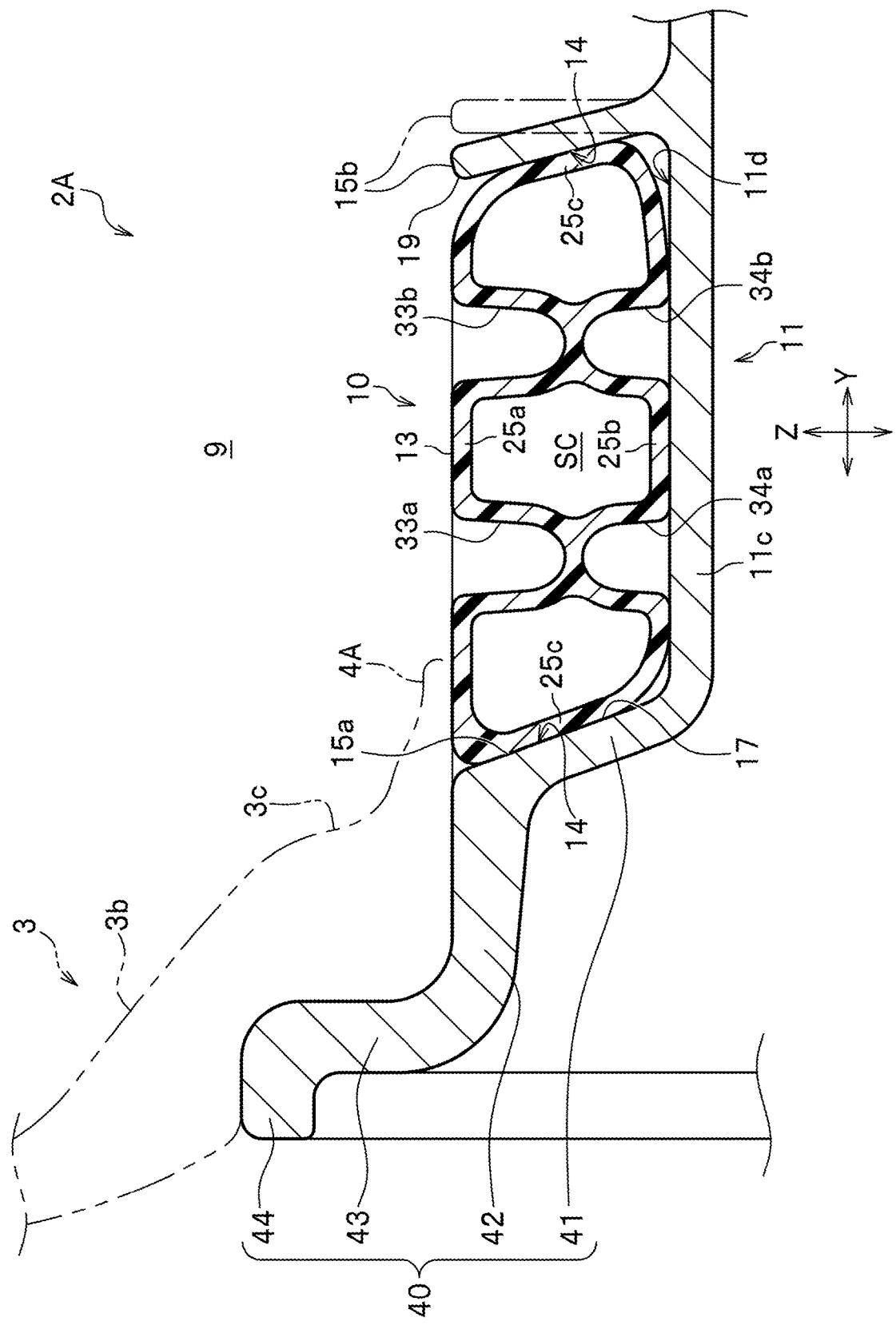
FIG. 4 is a partially enlarged cross-sectional view of the vehicle tire-wheel assembly according to the first embodiment of the present invention.

FIG. 1 is a perspective view of a vehicle wheel 1 according to a first embodiment of the present invention. FIG. 2 is an overall perspective view of a sub-air chamber member 10. FIG. 3 is a cross-sectional view taken along line in FIG. 1. FIG. 4 is a partially enlarged view of FIG. 3. As shown in FIG. 1, the vehicle wheel 1 of the present embodiment has a configuration in which a sub-air chamber member 10 (Helmholtz resonator) made of a synthetic resin such as a polyamide resin is attached to a rim 11 made of a metal such as an aluminum alloy or a magnesium alloy. In FIG. 1, reference sign 12 denotes a disk which is formed substantially in the shape of a circular disk to connect the rim 11 formed substantially in the shape of a circular cylinder to a hub (not illustrated). In other words, the vehicle wheel 1 include: a wheel main body formed by joining the rim 11 and the disk 12 by welding or the like; and the sub-air chamber member 10 attached to an outer peripheral surface 11d (see FIG. 3) of the rim 11.

The rim 11 has two end portions that are opposite to each other in the wheel width direction Y, at each of which a bead seat is formed, and has a well portion 11c recessed inward in the wheel radial direction (toward the center of rotation) between the bead seats. A bottom surface of this recess defines an outer peripheral surface 11d (see FIG. 3) of the well portion 11c, which has a substantially constant diameter about the wheel axis along the wheel width direction Y.

As shown in FIG. 3, the rim 11 according to the present embodiment includes a vertical wall 15a and a vertical wall 15b. These vertical walls 15a and 15b stand from the outer peripheral surface 11d outwardly in the wheel radial direction with a predetermined interval therebetween in the wheel width direction Y. Incidentally, the vertical wall 15a formed on the one side (vehicle width direction inner side) in the wheel width direction Y is formed at a rising portion 17 (first standing wall part 41) that rises from the outer peripheral surface 11d of the well portion 11c toward a rim flange (second standing wall portion 43 and flange portion 44, see FIG. 3). The vertical wall 15b is defined by a circumferential wall 19 that extends in the wheel circumferential direction X along a circumferential line of the outer peripheral surface 11d located substantially middle in the wheel width direction Y, and extends in the wheel circumferential direction X.

The vertical walls 15a and 15b each extend annularly in the wheel circumferential direction X with a predetermined interval therebetween, thereby defining later-described side surfaces 14 (see FIG. 4) that are opposed to each other. Each side surface 14 inclines inward in the vehicle width direction while extending from the outer peripheral surface 11d outward in the radial direction (see FIG. 3).

It should be noted that the vertical wall 15b may be in advance formed such that its side surface 14 inclines inward in the vehicle width direction while extending from the outer peripheral surface 11d outward in the radial direction (see FIG. 4). This configuration may be realized with a two-piece structure in which the wheel main body is formed of the rim 11 and the disk 12 (see FIG. 1). In this case, the rim 11 including the vertical wall 15b can be formed by aluminum extrusion.

Furthermore, the vertical wall 15b may be in advance formed such that the side surface 14 stands vertically from the outer peripheral surface 11d (see FIG. 4). In this case, the vertical wall 15b is inclined by bending in a step of attaching the sub-air chamber member 10.

Sub-Air Chamber Member

Next, a description will be given of the sub-air chamber member 10. As shown in FIG. 2, the sub-air chamber member 10 is a member which is elongated in one direction and includes a main body portion 13 and tube bodies 18. This sub-air chamber member 10 has a partition wall 16 extending in the wheel width direction Y in the middle of the main body portion 13, and has a shape symmetrical about the partition wall 16 in the wheel circumferential direction X.

The main body portion 13 is longitudinally curved. In other words, the main body portion 13 extends along the wheel circumferential direction X when the sub-air chamber member 10 is attached to the outer peripheral surface 11d (see FIG. 4) of the well portion 11c (see FIG. 1). The main body portion 13 has a hollow space inside. This hollow space (not illustrated) constitutes a sub-air chamber SC (see FIGS. 3 and 4) described later. The hollow space is partitioned by the partition wall 16 in the wheel circumferential direction X into two halves.

As shown in FIGS. 3 and 4, the main body portion 13 has a substantially rectangular (in more detail, parallelogram) shape elongated in the wheel width direction Y in a cross-sectional view orthogonal to the longitudinal direction (wheel circumferential direction X shown in FIG. 2) of the main body portion 13. Specifically, as shown in FIG. 4, the main body portion 13 includes a bottom portion 25b (bottom plate) disposed along the outer peripheral surface 11d of the well portion 11c, side portions 25c (side plates) disposed respectively along the side surfaces 14 of the pair of vertical walls 15a, 15b, and a top portion 25a (top plate) located opposite to the bottom portion 25b, which are integrally connected to one another to have a substantially rectangular (in more detail, parallelogram) shape.

According to the present embodiment, a height (height in the wheel radial direction Z) of the main body portion 13 from the outer peripheral surface 11d is substantially the same as a height of the vertical walls 15a, 15b.

The top portion 25a, the bottom portion 25b, and the side portions 25c described above define the sub-air chamber SC inside the main body portion 13 in a surrounding manner. Incidentally, the vertical wall 15b may be formed with a height higher than that of the main body portion 13 of the sub-air chamber member 10.

The top portion 25a has a plurality of upper joining portions 33a arranged on a vertical wall 15a side of the top portion 25a and in a longitudinal direction of the top portion 25a. In addition, the top portion 25a has a plurality of upper joining portions 33b arranged on a vertical wall 15b side of the top portion 25a and in the longitudinal direction of the top portion 25a. The plurality of upper joining portions 33b are formed aligned with the plurality of upper joining portions 33a in the wheel width direction Y.

As shown in FIG. 4, the bottom portion 25b has a plurality of lower joining portions 34a arranged on the vertical wall 15a side, at locations corresponding to the plurality of upper joining portions 33a. In addition, the bottom portion 25b has a plurality of lower joining portions 34b arranged on the vertical wall 15b side, at locations corresponding to the plurality of upper joining portions 33b.

The upper joining portions 33a, 33b and the lower joining portions 34a, 34b are each formed substantially in the shape of a bottomed circular cylinder. The upper joining portions 33a and the lower joining portions 34a are respectively joined to each other via their bottom portions. In addition, similarly, the upper joining portions 33b and the lower joining portions 34b are respectively joined to each other via their bottom portions. Thereby, the top portion 25a and the bottom portion 25b are integrally joined together, and the sub-air chamber SC extends between them.

It should be noted that, according to the present embodiment, as illustrated in FIG. 4, the top portion 25a and the bottom portion 25b are integrally connected to each other via the upper joining portions 33a, 33b recessed from the top portion 25a and the lower joining portions 34a, 34b recessed from the bottom portion 25b. Nevertheless, the present invention may instead have a configuration in which the top portion 25a and the bottom portion 25b are integrally connected together by joining joining portions (not shown) formed partially recessed from one of the top portion 25a and the bottom portion 25b to the other of the top portion 25a and the bottom portion 25b.

Next, the tube bodies 18 (see FIG. 1) will be described. As shown in FIG. 1, each tube body 18 is formed on the main body portion 13 at a portion thereof located on the one side (vehicle width direction inner side) of the vehicle wheel 1 in the wheel width direction Y, so as to project in the wheel circumferential direction X from the main body portion 13.

As described, the sub-air chamber member 10 of the present embodiment has a shape symmetrical about the partition wall 16 in the wheel circumferential direction X. Accordingly, although FIG. 1 illustrates only one tube body 18, the tube bodies 18 of this embodiment are arranged on the main body portion 13 at two end portions thereof located symmetrically opposite to each other in the longitudinal direction (wheel circumferential direction X) so as to form a pair.

As shown in FIG. 2, a communication hole 18a is formed inside the tube body 18. The communication hole 18a extends from the inside of the tube body 18 and further extends inside the main body portion 13. The portion of the communication hole 18a that extends inside the main body portion 13 is formed by partially segmenting the hollow space of the main body portion 13 with a dividing wall 62. Incidentally, the dividing wall 62 of the present embodiment is defined by a recess 60, which is recessed from the top portion 25a toward the bottom portion 25b, and a recess 64, which is recessed from the bottom portion 25b toward the top portion 25a. The above-described communication hole 18a establishes communication between the sub-air chamber SC (see FIG. 3) formed inside the main body portion 13 and a tire air chamber 9 (see FIG. 3) formed above the well portion 11c (see FIG. 3) and between the well portion 11c and a tire (see FIG. 3).

The sub-air chamber member 10 of the present embodiment is a blow-molded product using a synthetic resin such as a polyamide resin as mentioned earlier. Here, although the synthetic resin is not limited to a particular type, it is particularly preferable to use a polyamide resin in which polyamide MXD6 is used as a base resin or a nylon 6.

Vehicle Tire-Wheel Assembly

As shown in FIG. 3, a vehicle tire-wheel assembly 2A according to the first embodiment of the present invention includes the vehicle wheel 1 and a tire 3. The vehicle wheel 1 is formed by combining the circular cylinder-shaped rim 11 and the circular disk-shaped disk 12, which is so called two-piece structure.

As shown in FIGS. 1 and 3, the rim 11 integrally includes: the circular cylinder-shaped well portion (small-diameter portion) 11c; and annular large-diameter portions 40, 40 extending from two opposite end portions of the well portion 11c. Each large-diameter portion 40 includes: the first standing wall part 41 (corresponding to the vertical wall 15a) extending outward in the radial direction from an end portion of the well portion (small-diameter portion) 11c; and a bead seat 42 extending in a direction opposite to the well portion 11c (outward in the width direction of the rim 11) from a radial direction outer end portion of the first standing wall part 41. As the rim flange, the large-diameter portion 40 further includes: the second standing wall portion 43 extending outward in the radial direction from a distal end portion of the bead seat 42; and the flange portion 44 extending in the direction opposite to the well portion 11c (outward in the width direction of the rim 11) from a radial direction outer end portion of the second standing wall portion 43.

As shown in FIG. 3, the disk 12 is provided covering a radial direction inner side of one large-diameter portion 40 (on an outer side in the vehicle width direction).

As shown in FIG. 3, the tire 3 is attached to the outer peripheral surface of the rim 11, and forms the tire air chamber 9 together with the well portion 11c. The tire 3 is a member made of a resin and includes: an outer peripheral wall portion 3a in contact with the road surface; and side wall portions 3b, 3b extending inward in the radial direction from the opposite end portions of the outer peripheral wall portion 3a. Each of the side wall portions 3b has a distal end portion at which a bead portion 3c is formed to be placed on a bead seat 42 of the corresponding large-diameter portion 40 and fitted inwardly of the corresponding second standing wall portion 43 serving as the rim flange.

Separation Restraining Part

As shown in FIG. 4, the vehicle tire-wheel assembly 2A has a separation restraining part 4A. In cooperation with the tire 3, the separation restraining part 4A restrains the sub-air chamber member 10 from separating from the rim 11. In the present embodiment, the separation restraining part 4A is a tire extension portion formed integral with the tire 3 and extending from one bead portion 3c of the tire 3 toward the inside of the tire 3. The separation restraining part 4A is formed annularly all along the circumference of the bead portion 3c and comes into contact with a radial direction outer surface of the top portion 25a of the sub-air chamber member 10. The separation restraining part 4A holds down the sub-air chamber member 10, to which the centrifugal force is applied in a direction away from the well portion 11c during the traveling of the vehicle.

Specifically, as illustrated in FIGS. 3 and 4, one width direction end portion of the sub-air chamber member 10 (on a width direction end portion side of the vehicle wheel 1) is held down by the separation restraining part 4A. In addition, the other width direction end portion of the sub-air chamber member 10 (on a side of a width direction central portion of the vehicle wheel 1 (see FIG. 1)) is held by the vertical wall 15b.

Assembling Method

Referring to FIGS. 3 and 4, a description will be given of a method of assembling the vehicle tire-wheel assembly 2A (including a method of assembling the vehicle wheel 1) according to the present embodiment. Before assembling, the vertical wall 15b has been provided vertically standing from the well portion 11c (see the alternate long and short dash line in FIG. 4). The worker installs the sub-air chamber member 10 in the well portion 11c. Thereafter, the worker tilts the vertical wall 15b toward the sub-air chamber member 10 using a jig (not illustrated) (for example, spinning processing equipment), and thereby brings the side surface 14 into contact with the side portion 25c of the sub-air chamber member 10.

Subsequently, the worker attaches the tire 3 to the large-diameter portions 40. At this moment, the separation restraining part 4A extending from the corresponding bead portion 3c of the tire 3 comes into contact with the top portion 25a of the sub-air chamber member 10.

Operation and Advantageous Effects

Next, referring to FIGS. 3 and 4, a description will be given of the operations and effects that can be achieved by the vehicle tire-wheel assembly 2A of the present embodiment. The vehicle tire-wheel assembly 2A according to the present embodiment includes: the wheel main body; the Helmholtz resonator (sub-air chamber member 10) provided on the outer peripheral surface 11d of the well portion 11c of the wheel main body; the tire 3 attached to the outer peripheral surface of the wheel main body so that the tire covers the Helmholtz resonator; and the separation restraining part 4A which, in cooperation with the tire 3, restrains the Helmholtz resonator from separating from the outer peripheral surface 11d.

With this structure, the vehicle tire-wheel assembly 2A is capable of suitably preventing the Helmholtz resonator from separating from the wheel main body due to the centrifugal force, using a simple configuration which does not require the rim 11 to be processed by cutting or the like.

Moreover, the separation restraining part 4A of the vehicle tire-wheel assembly 2A is constituted by the tire extension portion extending from the tire 3 and holding the outer side of the Helmholtz resonator in the radial direction.

With this structure, the vehicle tire-wheel assembly 2A is capable of suitably preventing the Helmholtz resonator from separating from the wheel main body due to the centrifugal force, using a simple configuration such that the tire 3 is provided with the extension portion.

Moreover, the wheel main body of the vehicle wheel 1 of the vehicle tire-wheel assembly 2A includes the vertical wall 15b provided standing on the outer peripheral surface 11d of the well portion 11c and extending in the circumferential direction, the vertical wall 15b extends outwardly in the radial direction of the well portion and inclines toward to the Helmholtz resonator, and is in contact with the Helmholtz resonator. With this structure, the vehicle tire-wheel assembly 2A is capable of suitably preventing the Helmholtz resonator from separating from the wheel main body due to the centrifugal force, because the vertical wall 15b holds the Helmholtz resonator.

Moreover, the wheel main body of the vehicle wheel 1 of the vehicle tire-wheel assembly 2A is formed by combining the disk 12 and the rim 11 including the well portion 11c, and the rim 11 is formed by aluminum extrusion. With this structure, the vehicle tire-wheel assembly 2A is capable of suitably preventing the Helmholtz resonator from separating from the wheel main body due to the centrifugal force, because the inclined vertical wall 15b can be easily formed.

In addition, the method of assembling the vehicle wheel 1 according to the present embodiment includes steps of: installing the Helmholtz resonator on the outer peripheral surface 11d of the well portion 11c of the wheel main body; and bringing the vertical wall 15b, provided standing on the outer peripheral surface 11d of the well portion 11c of the wheel main body and extending in the circumferential direction of the well portion, into contact with the Helmholtz resonator by tilting the vertical wall 15b so that the vertical wall 15b extends outwardly in the radial direction of the well portion and inclines toward the Helmholtz resonator.

This method of assembling the vehicle wheel 1 does not require the vertical wall 15b to be tilted at the stage of producing the wheel main body. In addition, the vertical wall 15b can be securely brought into contact with the Helmholtz resonator by tilting the vertical wall 15b after installing the Helmholtz resonator. This makes it possible to suitably prevent the Helmholtz resonator from separating from the wheel main body due to the centrifugal force.

Furthermore, the method of assembling the vehicle tire-wheel assembly 2A according to the present embodiment further includes steps of attaching the tire 3 to the outer peripheral surface of the wheel main body so that the tire covers the Helmholtz resonator, and restraining the Helmholtz resonator from separating from the outer peripheral surface 11d using the tire 3 and the separation restraining part 4A. This method of assembling the vehicle tire-wheel assembly 2A makes it possible to suitably prevent the Helmholtz resonator from separating from the wheel main body due to the centrifugal force, using a simple process which does not require the rim 11 to be processed by cutting or the like.

Second Embodiment

Next, a description will be hereinafter given of a vehicle tire-wheel assembly according to a second embodiment of the present invention, by focusing on what makes the vehicle tire-wheel assembly according to the second embodiment different from the vehicle tire-wheel assembly 2A according to the first embodiment.

Figure 5:
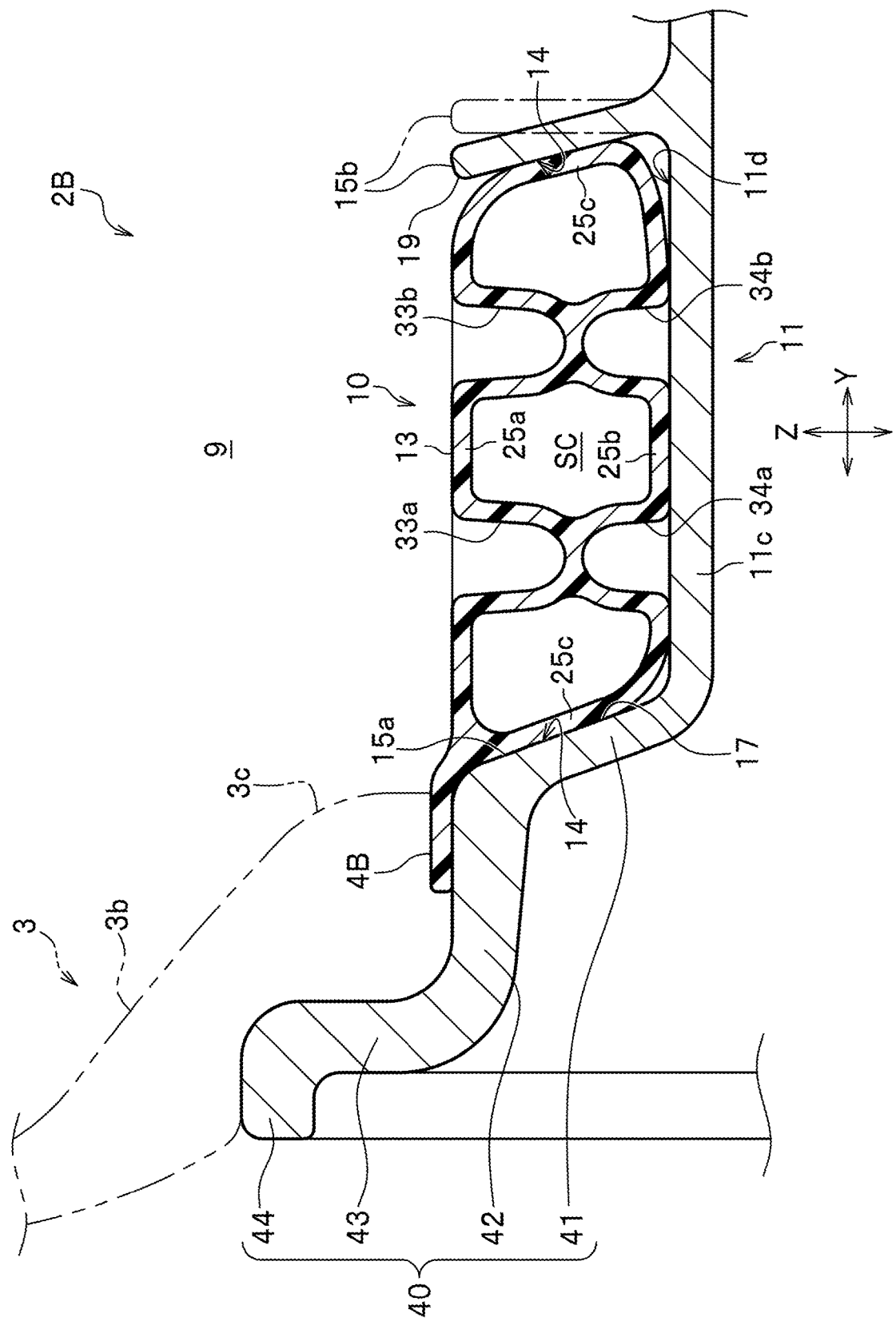
FIG. 5 is a partially enlarged cross-sectional view of a vehicle tire-wheel assembly according to a second embodiment of the present invention.

As shown in FIG. 5, the vehicle tire-wheel assembly 2B according to the second embodiment of the present invention includes a separation restraining part 4B in place of the separation restraining part 4A. According to the second embodiment, the separation restraining part 4B is a Helmholtz resonator extension portion formed integrally with the sub-air chamber member 10 and extending from an upper end portion of one side portion 25c of the sub-air chamber member 10. The separation restraining part 4B is held between the corresponding bead seat 42 of the large-diameter portion 40 and the corresponding bead portion 3c of the tire 3.

Assembling Method

Next, a descriptions will be given of a method of assembling the vehicle tire-wheel assembly 2B (including a method of assembling the vehicle wheel 1) according to the second embodiment. Before assembling, the vertical wall 15b has been provided vertically standing from the well portion 11c (see the alternate long and short dash line in FIG. 5). The worker installs the sub-air chamber member 10 on the well portion 11c. At this moment, the separation restraining part 4B extending from the sub-air chamber member 10 is placed on the bead seat 42 of the corresponding large-diameter portion 40. Then, the worker tilts the vertical wall 15b toward the sub-air chamber member 10 using a jig (not illustrated) (for example, spinning processing equipment), and thereby brings the side surface 14 into contact with the side portion 25c of the sub-air chamber member 10.

Subsequently, the worker attaches the tire 3 to the large-diameter portions 40. At this moment, the separation restraining part 4B extending from the sub-air chamber member 10 is held between the bead seat 42 of the corresponding large-diameter portion 40 and the corresponding bead portion 3c of the tire 3.

Operation and Advantageous Effects

Next, a description will be given of the operations and effects that can be achieved by the vehicle tire-wheel assembly 2B of the second embodiment.

The separation restraining part 4B of the vehicle tire-wheel assembly 2B according to the second embodiment includes the resonator extension portion which extends from the Helmholtz resonator and is held between the wheel main body and the tire 3.

This vehicle tire-wheel assembly 2B is capable of suitably preventing the Helmholtz resonator from separating from the wheel main body due to the centrifugal force, using a simple configuration such that the Helmholtz resonator is provided with an extension portion.

Third Embodiment

Next, a descriptions will be given of a vehicle tire-wheel assembly according to a third embodiment of the present invention, by focusing on what makes the vehicle tire-wheel assembly according to the third embodiment different from the vehicle tire-wheel assembly 2A according to the first embodiment.

Figure 6:
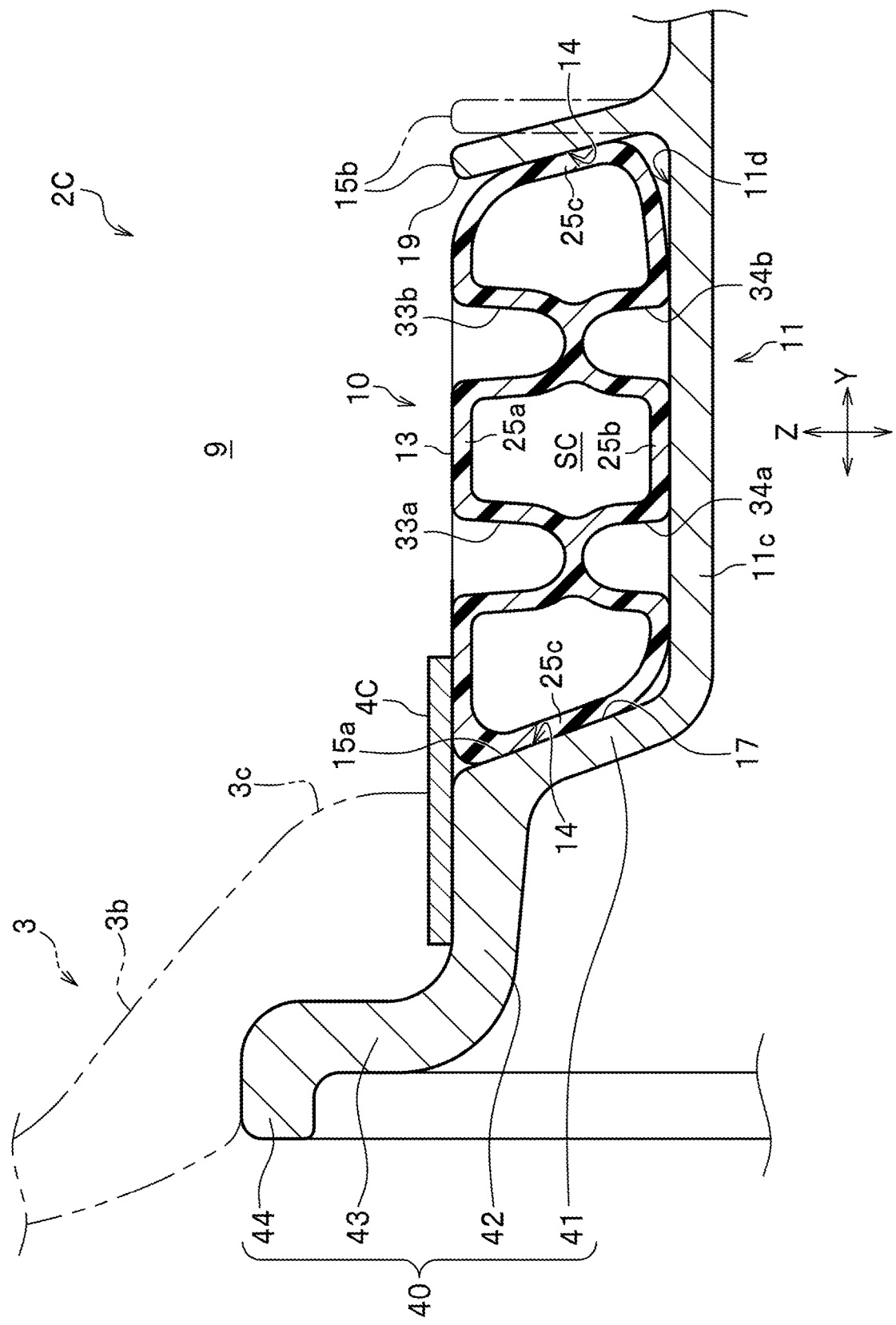
FIG. 6 is a partially enlarged cross-sectional view of the vehicle tire-wheel assembly according to a third embodiment of the present invention.

As shown in FIG. 6, a vehicle tire-wheel assembly 2C according to the third embodiment of the present invention includes a separation restraining part 4C in place of the separation restraining part 4A. In the third embodiment, the separation restraining part 4C is a separation restraining member formed separately from the tire 3 and the sub-air chamber member 10. The separation restraining part 4C is made of a metal or a resin, has a plate-like cross section, and is formed in the shape of an arc having substantially the same length as the sub-air chamber member 10 in the circumferential direction. One width direction end portion of the separation restraining part 4C is held between the bead seat 42 of the corresponding large-diameter portion 40 and the corresponding bead portion 3c of the tire 3. The other width direction end portion of the separation restraining part 4C is in contact with the radial direction outer surface of the top portion 25a of the sub-air chamber member 10. The separation restraining part 4C holds down the sub-air chamber member 10, to which the centrifugal force is applied in the direction away from the well portion 11c during the traveling of the vehicle.

Assembling Method

A descriptions will be hereinafter given of a method of assembling the vehicle tire-wheel assembly 2C (including a method of assembling the vehicle wheel 1) according to the third embodiment. Before assembling, the vertical wall 15b has been provided vertically standing from the well portion 11c (see the alternate long and short dash line in FIG. 6). The worker installs the sub-air chamber member 10 on the well portion 11c. Thereafter, the worker tilts the vertical wall 15b toward the sub-air chamber member 10 using a jig (not illustrated) (for example, spinning processing equipment), and thereby brings the side surface 14 into contact with the side portion 25c of the sub-air chamber member 10.

Subsequently, the worker places the separation restraining part 4C from on the bead seat 42 of the corresponding large-diameter portion 40 to on the sub-air chamber member 10. In this process, the worker may temporarily fix the separation restraining part 4C to the bead seat 42 and/or the sub-air chamber member 10 with an adhesive.

After that, the worker attaches the tire 3 to the large-diameter portion 40. At this moment, the separation restraining part 4C is held between the bead seat 42 of the corresponding large-diameter portion 40 and the corresponding bead portion 3c of the tire 3.

Operation and Advantageous Effects

Next, a description will be given of the operations and advantageous effects that can be achieved by the vehicle tire-wheel assembly 2C of the third embodiment will be described. The separation restraining part 4C of the vehicle tire-wheel assembly 2C according to the third embodiment is a separation restraining member, one portion of which is held between the wheel main body and the tire 3, and another portion of which holds the radial direction outer side of the Helmholtz resonator.

This vehicle tire-wheel assembly 2C is capable of suitably preventing the Helmholtz resonator from separating from the wheel main body due to the centrifugal force, using a simple configuration such that the separation restraining part 4C is provided between the wheel main body and the tire 3.

Although some embodiments of the present invention have been described, the present invention is not limited to those embodiments and can be carried out in various modes. In the above-described embodiments, the sub-air chamber member 10 (see FIG. 3) is formed from only the synthetic resin. However, the sub-air chamber member 10 may instead be made of two or more types of different materials.

In addition, a vehicle tire-wheel assembly according to the present invention may include both the separation restraining parts 4A, 4B, or may include at least one of the separation restraining parts 4A, 4B, as well as the separation restraining part 4C. Furthermore, the separation restraining parts 4A, 4C may be formed holding the sub-air chamber member 10 all in the width direction. In this case, the vertical wall 15b does not have to be tilted.

Moreover, the method of assembling the vehicle wheel 1 according to the present embodiment may include: tilting the vertical wall 15b, provided standing on the outer peripheral surface 11d of the well portion 11c of the wheel main body and extending in the circumferential direction of the well portion 11c, so that the vertical wall 15b extends outwardly in the radial direction of the well portion 11c and inclines toward where the Helmholtz resonator is to be installed; and installing the Helmholtz resonator on the outer peripheral surface 11d of the well portion 11c of the wheel main body and so as to bring the vertical wall 15b into contact with the Helmholtz resonator.

This method of assembling the vehicle wheel 1 does not require the vertical wall 15b to be tilted at the stage of producing the wheel main body. In addition, the method makes it possible to suitably prevent the Helmholtz resonator from separating from the wheel main body due to the centrifugal force.

What is claimed is:

1. A vehicle tire-wheel assembly comprising:
a wheel main body;
a Helmholtz resonator provided on an outer peripheral surface of a well portion of the wheel main body;
a tire attached to an outer peripheral surface of the wheel main body so that the tire covers the Helmholtz resonator; and
a separation restraining part which, in cooperation with the tire, restrains the Helmholtz resonator from separating from the outer peripheral surface of the well portion,
wherein the wheel main body includes a first vertical wall and a second vertical wall located spaced apart from the first vertical wall in a wheel width direction with a predetermined interval therebetween, the first and second vertical walls standing from the outer peripheral surface of the well portion outwardly in a wheel radial direction and extending in a circumferential direction of the well portion, the first vertical wall having a side surface inclined toward the Helmholtz resonator,
wherein the Helmholtz resonator includes a main body portion disposed between the first and second vertical walls of the wheel main body,
wherein the main body portion includes a bottom portion disposed along the outer peripheral surface of the well portion, a first side portion located in one wheel width direction end portion of the main body portion and disposed along and in contact with the side surface of the first vertical wall, a second side portion located in the other wheel width direction end portion of the main body portion and disposed along and in contact with a side surface of the second vertical wall, a top portion located opposite to the bottom portion, the bottom portion, the first side portion, the second side portion, and the top portion together defining a substantially rectangular shape in a cross-sectional view orthogonal to a longitudinal direction of the main body portion, and
wherein a radial direction outer side of the other wheel width direction end portion of the main body portion of the Helmholtz resonator is held down in a radially inward direction by the separation restraining part in cooperation with the tire.

2. The vehicle tire-wheel assembly of claim 1,
wherein the separation restraining part includes a tire extension portion which extends from the tire and holds down the radial direction outer side of the other wheel width direction end portion of the main body portion of the Helmholtz resonator.

3. The vehicle tire-wheel assembly of claim 1,
wherein the separation restraining part includes a resonator extension portion which extends from the other wheel width direction end portion of the main body portion of the Helmholtz resonator and is held between the wheel main body and the tire.

4. The vehicle tire-wheel assembly of claim 2,
wherein the separation restraining part includes a resonator extension portion which extends from the other wheel width direction end portion of the main body portion of the Helmholtz resonator and is held between the wheel main body and the tire.

5. The vehicle tire-wheel assembly of claim 1,
wherein the separation restraining part is a separation restraining member having a first portion held between the wheel main body and the tire and a second portion that holds down the radial direction outer side of the other wheel width direction end portion of the main body portion of the Helmholtz resonator.

6. The vehicle tire-wheel assembly of claim 1,
wherein the wheel main body is formed by combining a disk and a rim including the well portion, and
wherein the rim is formed by aluminum extrusion.

7. The vehicle tire-wheel assembly of claim 2,
wherein the wheel main body is formed by combining a disk and a rim including the well portion, and
wherein the rim is formed by aluminum extrusion.

8. The vehicle tire-wheel assembly of claim 3,
wherein the wheel main body is formed by combining a disk and a rim including the well portion, and
wherein the rim is formed by aluminum extrusion.

9. The vehicle tire-wheel assembly of claim 4,
wherein the wheel main body is formed by combining a disk and a rim including the well portion, and
wherein the rim is formed by aluminum extrusion.

10. The vehicle tire-wheel assembly of claim 5,
wherein the wheel main body is formed by combining a disk and a rim including the well portion, and
wherein the rim is formed by aluminum extrusion.

11. The vehicle tire-wheel assembly of claim 1,
wherein the substantially rectangular shape defined together by the bottom portion, the first side portion, the second side portion, and the top portion of the main body portion of the Helmholtz resonator is a parallelogram shape such that lateral sides of the parallelogram shape are inclined in a direction in which the side surface of the first vertical wall is inclined.

12. The vehicle tire-wheel assembly of claim 11,
wherein the first side portion of the main body portion of the Helmholtz resonator is in face-to-face contact with the side surface of the first vertical wall of the wheel main body.

13. The vehicle tire-wheel assembly of claim 2,
wherein the substantially rectangular shape defined together by the bottom portion, the first side portion, the second side portion, and the top portion of the main body portion of the Helmholtz resonator is a parallelogram shape such that lateral sides of the parallelogram shape are inclined in a direction in which the side surface of the first vertical wall is inclined, and
wherein the tire extension portion holds down a wheel width direction end portion of the top portion of the main body portion of the Helmholtz resonator, the wheel width direction end portion of the top portion of the main body portion of the Helmholtz resonator located in the other wheel width direction end portion of the main body portion of the Helmholtz resonator.

14. The vehicle tire-wheel assembly of claim 13,
wherein the first side portion of the main body portion of the Helmholtz resonator is in face-to-face contact with the side surface of the first vertical wall of the wheel main body.

15. The vehicle tire-wheel assembly of claim 3,
wherein the substantially rectangular shape defined together by the bottom portion, the first side portion, the second side portion, and the top portion of the main body portion of the Helmholtz resonator is a parallelogram shape such that lateral sides of the parallelogram shape are inclined in a direction in which the side surface of the first vertical wall is inclined, and
wherein the resonator extension portion extends from a wheel width direction end portion of the top portion of the main body portion of the Helmholtz resonator, the wheel width direction end portion of the top portion of the main body portion of the Helmholtz resonator being located in the other wheel width direction end portion of the main body portion of the Helmholtz resonator.

16. The vehicle tire-wheel assembly of claim 15,
wherein the first side portion of the main body portion of the Helmholtz resonator is in face-to-face contact with the side surface of the first vertical wall of the wheel main body.

17. The vehicle tire-wheel assembly of claim 5,
wherein the substantially rectangular shape defined together by the bottom portion, the first side portion, the second side portion, and the top portion of the main body portion of the Helmholtz resonator is a parallelogram shape such that lateral sides of the parallelogram shape are inclined in a direction in which the side surface of the first vertical wall is inclined, and
wherein the separation restraining part has a plate-like cross section and is formed in the shape of an arc having substantially the same length as the Helmholtz resonator in the circumferential direction of the well portion.

18. The vehicle tire-wheel assembly of claim 17,
wherein the first side portion of the main body portion of the Helmholtz resonator is in face-to-face contact with the side surface of the first vertical wall of the wheel main body.

* * * * *